(12) United States Patent
Dimmler

(10) Patent No.: US 12,218,979 B2
(45) Date of Patent: Feb. 4, 2025

(54) SECURITY POLICY COMPLIANCE VERIFICATION AND CERTIFICATION AS A SERVICE LEVERAGING SYSTEMS PROVIDING ACCESS MANAGEMENT AS A SERVICE

(71) Applicant: Pax8, Inc., Greenwood Village, CO (US)

(72) Inventor: Klaus Dimmler, Colorado Springs, CO (US)

(73) Assignee: PAX8, INC., Greenwood Village, CO (US)

(*) Notice: Subject to any disclaimer, the term of this patent is extended or adjusted under 35 U.S.C. 154(b) by 224 days.

(21) Appl. No.: 18/079,396

(22) Filed: Dec. 12, 2022

(65) Prior Publication Data

US 2024/0195838 A1    Jun. 13, 2024

(51) Int. Cl.
| | | |
|---|---|---|
| *H04L 29/06* | (2006.01) |
| *H04L 9/40* | (2022.01) |
| *H04L 41/22* | (2022.01) |
| *G06F 21/50* | (2013.01) |
| *G06F 21/57* | (2013.01) |

(52) U.S. Cl.
CPC .............. *H04L 63/20* (2013.01); *H04L 41/22* (2013.01); *H04L 63/1433* (2013.01)

(58) Field of Classification Search
CPC ...... H04L 63/20; H04L 41/22; H04L 63/1433
See application file for complete search history.

(56) References Cited

U.S. PATENT DOCUMENTS

| 2021/0295223 A1* | 9/2021 | Freeman | .............. G06F 11/3428 |
| 2023/0195857 A1* | 6/2023 | Nelson | ................... G06F 21/105 |
| | | | 726/26 |

FOREIGN PATENT DOCUMENTS

WO    WO-2016190883 A1 * 12/2016 ........... G06F 21/552

OTHER PUBLICATIONS

Binbin Zhao, Shouling Ji, Jiacheng Xu, Yuan Tian, Qiuyang Wei, Qinying Wang, Chenyang Lyu , Xuhong Zhang , Changting Lin , Jingzheng Wu, and Raheem Beyah, "One Bad Apple Spoils the Barrel: Understanding the Security Risks Introduced by Third-Party Components in IoT Firmware"; May 2024; pp. 1372-1389 (Year: 2024).*

* cited by examiner

*Primary Examiner* — Fatoumata Traore
*Assistant Examiner* — Courtney D Fields
(74) *Attorney, Agent, or Firm* — Brownstein Hyatt Farber Schreck, LLP

(57) ABSTRACT

A system and method for providing access to third-party application programming interfaces (APIs) as a service. In particular, an API access manager can be configured to execute one or more serverless functions selected form a database of serverless functions in order to obtain data from one or more third-party APIs. Retrieved data can be used to evaluate compliance with one or more information security policies.

19 Claims, 7 Drawing Sheets

SECURITY POLICY COMPLIANCE VERIFICATION AND CERTIFICATION AS A SERVICE LEVERAGING SYSTEMS PROVIDING ACCESS MANAGEMENT AS A SERVICE

TECHNICAL FIELD

Embodiments described herein relate to data and service access management systems and, in particular, to systems and methods for leveraging a data and service access management system architecture to provide security policy compliance verification and certification as a service.

BACKGROUND

An organization may provide its employees with access to one or more software tools to facilitate collaboration and completion of work. In lieu of developing in-house software tools and services, a typical organization licenses access for its employees to various third-party software tools and services, such as emails services, document storage systems, office suites, design platforms, and so on. To simplify business operations, many organizations (especially small and medium-sized businesses) engage a managed service provider (MSP) to administer, support, and provide access to third-party software tools from one or more third-party software vendors. However, managing organizations as clients, supporting their software deployments, managing respective licenses therefor, and understanding various billing tiers and discount structures of multiple third-party software providers is often a cumbersome and time consuming process for both MSPs and organizations alike, often resulting in inefficient over-purchasing by organizations and/or tedious manual management of licenses and provisioning/deployment of services by MSPs.

As a result of the conventional complexity associated with supporting multi-vendor licensed software deployments for an organization by an MSP, information and data security policy compliance is often de-prioritized or entirely ignored. In some cases, security policy compliance is a responsibility disclaimed by both MSPs and organizations alike; organizations are under the false impression that MSPs ensure all software deployments are compliant with all modern security policies and principles and, likewise, MSPs are under the false impression that organizations are solely responsible for their own information security compliance. This intentional or accidental mutual disclaimer of responsibility leads to confusion and, more importantly, exposes organizations, MSPs, and software vendors alike to unknowable security risks. As a result, data breach insurance rate increases tend to diverge from actual, quantifiable, risks of liability.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
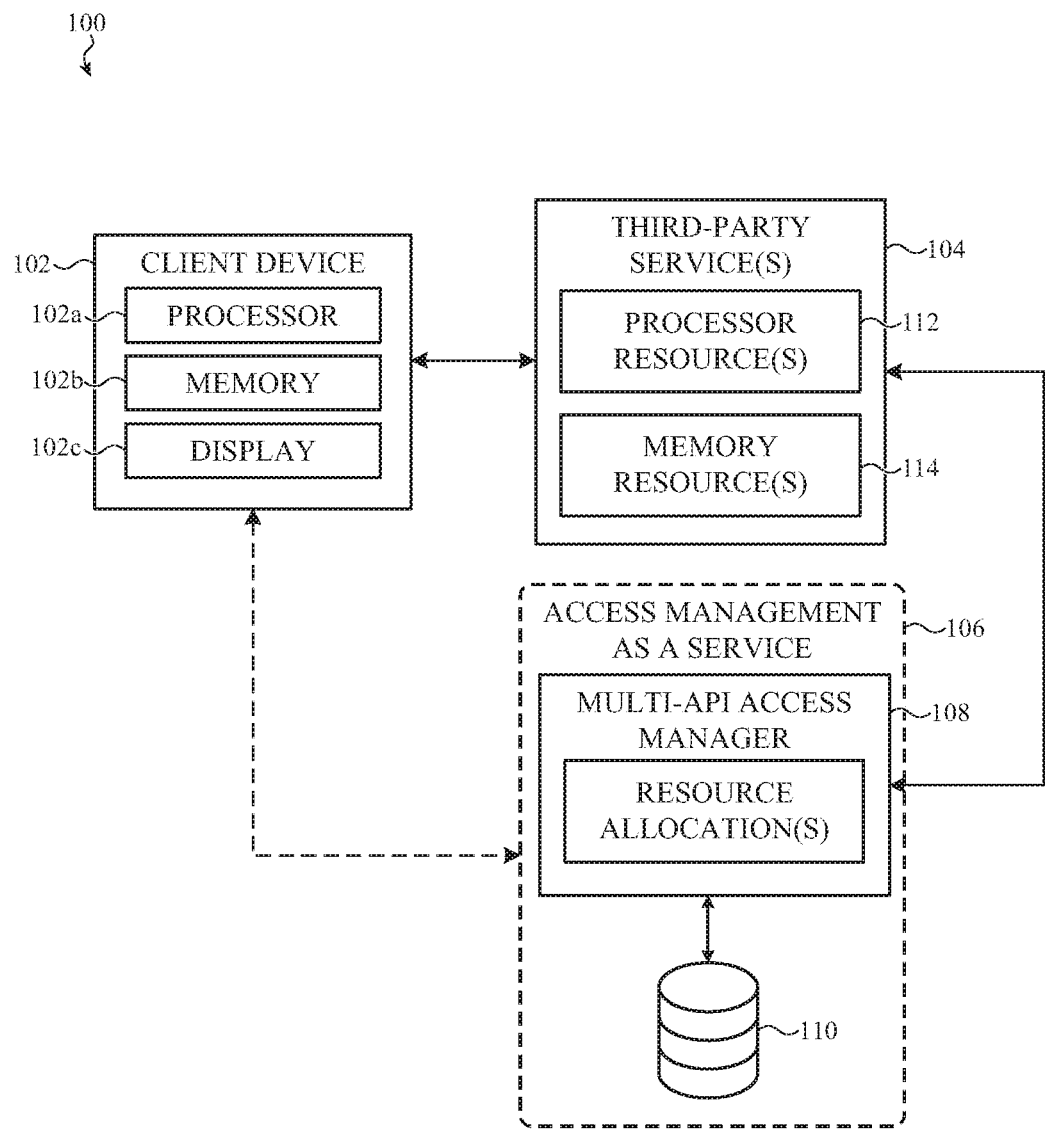
FIG. 1 depicts a system for providing access management as a service, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to computing systems, computer architectures, and computer-implemented methods configured to provide, control, and manage access to third-party software tools.

In particular, embodiments described herein relate to systems and methods that leverage such architectures, and data generated by and/or accessible as a result of such architectures, to provide security compliance verification, analysis, and certification as a service. More specifically, a system described herein facilitates access to one or more third-party software provider API endpoints so that security policy compliance testing can be performed against production data (e.g., usage data, configuration data, and so on) stored by one or more third-party systems. In other cases, usage data may not be retrieved on a schedule, but may be pushed from third-party platforms to a system as described herein.

More simply, embodiments described herein simplify MSP workflows by providing a centralized interface configured to couple to multiple third-party software vendor APIs thereby providing a convenient and efficient method for an MSP to bundle and manage different software products and licensing structures for organizational clients of that MSP. An MSP can leverage such a system to simplify billing and license management for multiple small and medium-sized businesses (SMBs), which in turn can free up time and bandwidth for the MSP to service more organizational clients and/or to provide more hands-on support to existing clients.

Such a centralized system has many benefits beyond simplifying business operations for MSPs and/or reducing costs for MSPs and organizations alike. In particular, a centralized system providing, as a service, access to third-party data and third-party software services can be used to efficiently audit individual organizations' security policy compliances on a near real-time basis. In particular, as a result of the "access management as a service" architecture described herein, information and/or metadata generated in respect of a particular organization's use of third-party software tools can be automatically reviewed for security compliance, without requiring specialized knowledge or training of the organization or an MSP servicing that organization and without requiring the organization to engage a specialized contractor to periodically audit security compliance.

As a trivial example, a system described herein can quickly and efficiently enumerate currently-deployed versions of all software licensed by an given organization, independent of software vendor. As a result, outdated software deployments that may introduce vulnerabilities and security risks can be readily identified. Once identified, an alert may be transmitted to an MSP and/or to an organization's security operations center or chief information security officer or information technology administrator.

In addition, a system as described herein can be configured to query a metrics APIs of each third-party software product licensed by that organization so as to further understand how the organization is using and/or accessing each software product (e.g., what devices, and versions thereof, are accessing which services), and whether such use is in compliance with security policies (e.g., whether cloud services are being accessed by client devices with updated software, as one example).

For example, a COMPANY may engage an MSP to obtain licensing to a cloud-based data storage system, an office suite, and one or more operating systems to be installed on personal computing devices such as COMPANY laptops. In response to the request from the COMPANY, the MSP can leverage an access management platform as described herein, which is configured to automatically hook into license management APIs from data storage system providers, office suite providers, and operating system providers.

The MSP can, through a user interface of the access management platform, select a bundle of products suitable for the COMPANY, which may be from three different software vendors. In response, the access management system can generate appropriate requests to each selected third-party software/service vendor so as to generate/provision appropriate software licenses for the selected data storage system, the selected office suite, and the selected operating systems. Thereafter, the MSP may assist COMPANY with deploying such software.

Over time, new versions of the data storage system may be released by that software vendor. As one example, the data storage system software vendor may identify and patch a potential vulnerability. In some cases, either due to a decision or negligence or ignorance of the MSP or the COMPANY, re-deployment and/or upgrade of client software of the data storage system to each computing system or resource on which it was first deployed may be delayed, thereby exposing the COMPANY to potential liability if the vulnerability is exploited by a malicious actor and customer data (as one example) is exfiltrated from the data storage system.

In this example, a system as described herein can automatically recognize (e.g., by version comparison) that a new version of the data storage system is available. As noted above, the system can be configured to raise an alert for the MSP and/or for the COMPANY. In additional embodiments, however, the system can be configured to query one or more APIs of the data storage system to obtain utilization data, which in turn may disclose how many old-version installs/deployments of the data storage system remain.

For example, the COMPANY may have updated a client application of the data storage system on 9 out of 10 laptops; the remaining 10th laptop nevertheless exposes potential data loss or exploitation risk. A system described herein can query the usage API of the data storage system which, in turn, will report that 10% of requests from COMPANY's licensed installations of the data storage system client application are using an old version. With this information, a more specific alert can be generated for the MSP and/or for the COMPANY and/or for a specific employee of the company using the old-version client application.

The foregoing example is merely one example of leveraging data generated while using an access management system for security auditing and/or advising. In other cases, the data can be utilized by a third party, such as a third-party insurance carrier providing data breach insurance (as one example) to a particular organization.

In this example, a third-party insurance carrier can be provided with information characterizing a security posture of its policyholder organization or a potential new policyholder. Continuing the preceding example, the third-party insurance carrier can be notified that a potential breach point exists due to delayed software update. In response, the carrier can raise premiums to account for increased risk or can otherwise incentivize its policyholder organization, COMPANY, to complete and finalize upgrading of client software on the final laptop device.

In yet other examples, a system as described herein can be provided with a set of security policies of interest to an insurance carrier. As one example, an insurance carrier may be interested to know whether a potential policyholder has enabled two-factor authentication as a login security method. In this example, a system as described herein can query one or more usage APIs and/or may access one or more store software configurations or license descriptions to determine whether a particular organization has enabled 2FA and/or whether each licensed user of the organization's various software products is using 2FA consistently.

In these examples, a system as described herein can provide different output specific to a particular embodiment or preference of an insurance carrier (as one example) or other party interested in security posture auditing information. For example, the system can be configured to provide a binary output of YES 2FA or NO 2FA. In other cases, the system can be configured to provide a percentage output based on a number of users and/or a number of API requests, connections, or other countable access associated with the organization and/or its users. In this example, an output such as 95% USERS ENABLED 2FA or 76% OF REQUESTS ENABLED 2FA may be provided. A person of skill in the art may appreciate these are merely examples; any suitable indication of compliance, partial compliance, or noncompliance with a given input security policy, protocol, or technology may be used.

More broadly, a system as described herein can be used to generate one or more metrics that correspond to a security compliance posture of a particular organization. The metrics may be numerical, binary (e.g., true/false or compliant/noncompliant), or otherwise graduated to a normalized or custom scale.

In some cases, multiple metrics can be combined together into an aggregate security compliance score. As noted above, the score can be based on selected security policies or technologies (e.g., 2FA, particular software versions required, encryption, and so on). The score may be normalized to a particular range in some embodiments, although this is not required. The score can be tracked over time and may be used by one or more insurance carriers or other third-parties (e.g., investors, creditors, MSPs, service providers, and so on) to modify, in real time or near real time, policies, rates, service tiers, and so on for the subject organization.

These foregoing and other embodiments are discussed below with reference to FIGS. 1-6. However, those skilled in the art will readily appreciate that the detailed description given herein with respect to these figures is for explanation only and should not be construed as limiting.

FIG. 1 depicts a system for providing access management as a service, such as described herein. The system 100 can include, in a simplified architecture, and/or can be defined by communications by and between, a client device 102, a third-party service 104, and an access management service 106.

The client device 102 can be any suitable electronic device. Examples include, but are not limited to cellular phones, laptop computers, desktop computers, server computers, and so on. More generally, the client device 102 may be any electronic device or computing resource configured to communicably intercouple (e.g., via one or more networks) to one or more other electronic devices, such as a server computer executing an instance of the third-party service 104 or a server computer executing an instance of the access management service 106.

In some cases, the access management service 106 can be operated to, among other operations, request provisioning of licenses to access the third-party service 104 on behalf of a user of the client device 102. For example, the access management service 106 can be configured to leverage an API of the third-party service 104 to automatically request provisioning/issuance of one or more licenses to access the third-party service 104.

In other cases, the access management service 106 can be operated to revoke and/or terminate licenses. For example, the access management service 106 can be configured to receive a request from the third-party service 104 and/or the client device 102 (or an organization admin associated with the client device 102 and/or a user of the client device 102) to terminate a previously-granted license to access the third-party service 104.

In many constructions the access management service 106 and the third-party service 104 are each implemented as instances of software executing over one or more virtual or physical resources associated with a cloud-based infrastructure, such as may be provided by a cloud services provider. More specifically, in these embodiments, processing resources associated with, and/or allocated to, a particular server instance can cooperate with memory resources associated with the server instance to execute one or more computer readable instructions to instantiate an instance of software defining and/or implementing the third-party service 104 or the access management service 106.

More generally, although it may be appreciated that the access management service 106 and the third-party service 104 may be implemented in a number of ways and may be configured to communicate over a variety of protocols, in many embodiments each is implemented as a separate instance of cloud-based software supported by separate infrastructure.

It may be appreciated that the third-party service 104 can serve as a host of any suitable software product. Examples include, but are not limited to, email services, messaging services, instant messaging services, documentation services, office product services, word processing services, security services, database services, design services, translation services, music and/or video production services, IT infrastructure management services, and so on. These examples are not exhaustive.

As noted above, an access management service such as the access management service 106 can be configured to request and revoke software licenses to particular software products, such as to the third-party service 104. In addition, the access management service 106 can be configured to facilitate access to one or more functionalities of one or more third-party APIs (such as API endpoints provided by the third-party service 104) by maintaining a database and/or data set of particularly-configured individual serverless functions, each configured to execute a discrete task against, or with, data provided by the third-party service 104. For example, the access management service 106 can be configured to access a license usage statistics API endpoint of a particular third-party API of the third-party service 104.

More particularly, the access management service 106 can include an API access manager 108 in communication with a database 110 storing one or more serverless functions, such as described herein. As a result of this construction, the API access manager 108 can be configured to access to the database 110 to obtain one or more serverless functions, such as described above.

In some examples, the access management service 106 and/or the API access manager 108 can be leveraged by an MSP to generate invoices based on use of the third-party service 104 by a user of the client device 102. In other cases, the access management service 106 and/or the API access manager 108 can be leveraged by an MSP to generate invoices based on use of the third-party service 104 by an organization associated to the client device 102.

In other cases, however, the serverless functions available to and/or accessible by the access management service 106 can be used by an MSP to support an organization's third-party licensing needs, such as described above. In addition, the access management service 106 can be used to aggregate and/or obtain information such as usage information and/or software configuration information that may inform a security compliance score, such as described above.

More specifically, as noted above, any organization may engage an MSP and/or a value-added reseller (VAR) to license access to, and/or to actively administer, one or more third-party software tools, which may be referred to herein as "collaboration tools." Example collaboration tools include email services, telephony services, instant messaging systems, documentation systems, word processing systems, IT management systems, ticketing systems, issue tracking systems, incident response systems, software repositories, design platforms, video and/or audio production platforms, networking platforms, identify management systems, and so on. A person of skill in the art may appreciate that these example collaboration tools are not exhaustive of all types of software tools that may be licensed by an organization for use by one or more employees; an organization may license access to collaboration tools developed and maintained by different third-party software providers (herein, software "vendors").

As an organization's collaboration tool library (and/or employee headcount) grow, licensing costs likewise increase as does the importance of active license management. Phrased in another manner, organizations and MSPs/VARs may be often tasked with regularly auditing whether licenses are being actively used to identify unused licenses that can be terminated.

Similarly, as an organization's software requirements increase, security compliance obligations likewise increase. Simplistically, an organization should maintain industry standard data integrity and information security policies so as to prevent reputation damage and/or liability exposure to the organization itself. More fundamentally, however, an organization may be required by a business insurance carrier to maintain compliance with certain industry standard security policies. If the organization cannot verify that it is in compliance with the policies and/or standards selected by the business insurance carrier, premium rates for the business are likely to increase.

As a result, conventionally, many MSPs and/or VARs (hereafter referred to collectively and simply as MSPs) are tasked by their respective clients (e.g., organizations) to periodically certify compliance with one or more security policies required by insurance carriers of those respective clients. In many cases, however, an MSP may not be trained to provide security policy compliance certifications. In such circumstances, an organization in need of compliance certification may be required to engage a dedicated vendor to provide security compliance verification and compliance audits.

However, as may be readily appreciated by a person of skill in the art, scheduling and conducting security compliance audits on a regular basis may be extremely time consuming and costly for individual organizations and MSPs. As a result, insurance companies may reduce requirements (and increase premiums), require only infrequent audits (while increasing premiums to account for increased data breach exposure risk in between audits), or refuse to insure, and so on. In some cases, an organization may forego insurance such as data breach insurance altogether.

In yet other examples, a security audit may itself expose security and/or confidential information exposure/disclosure risks. For example, a security audit performed by an under-trained MSP may require a company to elevate permissions of the MSP so that the MSP may effectively audit one or more software configurations of the organization's software deployments. In other cases, an auditor or third party vendor may be temporarily granted administrative rights over one or more systems, which can expose organization-owned information or data to a (temporary) accidental disclosure risk.

In yet other cases, an organization may have different insurance carriers and/or interested investors or creditors that require compliance with different security policies and/or policy versions. In such cases, different vendors may be required to be engaged so as to ensure compliance with each specific policy.

More simply, conventionally, due to the multi-party overhead associated with ensuring security compliance with one or more standards or policies by an organization across multiple software product deployments licensed from multiple different software vendors, via an MSP, insurance carriers have, typically, either (1) increased premiums to account for increased unknown risk exposure or (2) have increased recertification intervals to ease compliance verification burdens. As may be appreciated, both of these results are undesirable, insecure, and/or inefficient.

Embodiments described herein and as noted above address these, and other inefficiencies, of conventional methods by (1) providing access to third-party software as a service in a centralized manner (e.g., via the access management service 106), (2) aggregating, receiving (e.g., via push) and/or otherwise obtaining usage data generated in respect of a particular organization across multiple software products and/or multiple software product vendors (e.g., by the access management service 106), (3) validating a set of security policy schemas against usage data and/or deployment configuration data (e.g., by the access management service 106), and (4) providing a single graphical user interface and graphical/numerical representation of security compliance of a particular organization that may, in turn, be accessed securely by a third-party insurance organization.

More simply, embodiments described herein can effectively generate security policy compliance scores that quantify a particular organization's security posture at any given time. The security compliance score can be captured and/or calculated in real-time and/or near real time and can be tracked over time, taking into consideration deployments of multiple software products associated with multiple software vendors. In this manner, very broadly and generally, a security compliance score of an organization as described herein may be analogously associated with a credit score of an individual.

Further, embodiments described herein can relate to systems and methods for exposing a security compliance score API to one or more third parties entitled to view and/or receive such information (such as insurance carriers). As a simple example, embodiments described herein can include a backend software instance supported by cloud infrastructure (e.g., including a processing resource and memory resource cooperatively coupled so as to instantiate an instance of software exposing an API endpoint that may service suitably privileged and/or configured requests from a client device, such as a computing device owned/operated by an insurance carrier) that may be accessed by submitting a request thereto.

The request may include an organization identifier (e.g., such as a tax identifier, an organization name, and organization-owned domain name, and so on). Once the backend receives an indication of an organization, a query can be generated of a database in communication with the backend instance. The database may be configured to store one or more security compliance scores associated with the organization associated with the received identifier. In response to the query, the database may return one or more security compliance scores that, in turn, can be encrypted and transmitted back to the request-originating device. In other cases, the security compliance score obtained from the database may be presented or conveyed in another manner; for example, in some cases, a set of compliance scores can be obtained from the database and presented as a time series graphic, depicting change in the compliance score over time.

More simply, as noted above in some embodiments, the access management service 106 as described herein can provide an interface to communicate "security compliance scores" that effectively evaluate a security posture of a particular identified organization to a third party. The scores can be presented in an API request response, a graphical user interface, or in another suitable way.

In some cases, the access management service 106 as described herein can present an API and/or a graphical user interface to configure how a security compliance score is calculated and/or presented to an interested party. For example, in some embodiments, the access management service 106 as described herein can present one or more selectable options identifying particular security policies of interest. For example, different security policies or industry standard tests or compliance standards can be selectably illustrated in a graphical user interface, allowing an interested third party to select one which policies are of interest to that party. These selections can inform how a security compliance score is calculated, presented, or obtained from a database.

In other cases, a third party can define their own scoring algorithm, preferring and/or discounting certain compliance datapoints on demand. For example, one insurer may strongly prefer 2FA being enabled and used, whereas other insurers (and/or particular policies) may not have a strong preference for 2FA usage.

The foregoing examples are not exhaustive; more generally and broadly it may be appreciated that in many embodiments the system 100 as described herein can include an interface (either graphical or programmatic) through which a third party can access security compliance scores that quantify a security posture of a particular organization. For simplicity of description, the embodiments that follow reference an API interface that provides, as output, a single score in response to receiving as input an identifier associated with an organization, but it is appreciated that this is merely one example.

These foregoing embodiments depicted in FIG. 1 and the various alternatives thereof and variations thereto are presented, generally, for purposes of explanation, and to facilitate an understanding of various configurations and constructions of an access management system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some cases, serverless functions to access third party APIs may not be required. In some cases, a backend application instance as described herein can be configured to host an API or a set of APIs that third-party vendors implement in order to integrate products into an MSP system as described herein. In yet other examples, serverless functions may not be required if third party software vendors implement common or industry-standard APIs. In yet other examples, a monolithic and/or microservice based architecture may be used. In yet other configurations, other system architectures are possible.

For example, it may be appreciated that a third-party service such as the third-party service 104 can be implemented in a number of suitable ways. In many constructions, the third-party service 104 will be implemented as a cloud-based product that is supported by physical infrastructure including at least one processing resource and at least one memory resource. For example, the processing resource 112 and the memory resource 114 can cooperate to instantiate an instance of software that serves one or more API requests from the API access manager 108 and/or from the client device 102.

Further, it may be appreciated that the client device 102 can be configured in a number of suitable ways. In one embodiment, the client device 102 is an electronic device that includes a processor 102a, a memory 102b, and a display 102c. The processor 102a and the memory 102b cooperate to instantiate an instance of software that can be configured to communicate with and/or exchange information with the API access manager 108 and/or the third-party service 104. In some examples, the instance of software may be referred to as a client application and/or frontend that corresponds to a backend instance operated at the third-party service 104 and/or the API access manager 108.

The foregoing examples are not exhaustive; many constructions are possible.

Figure 2:
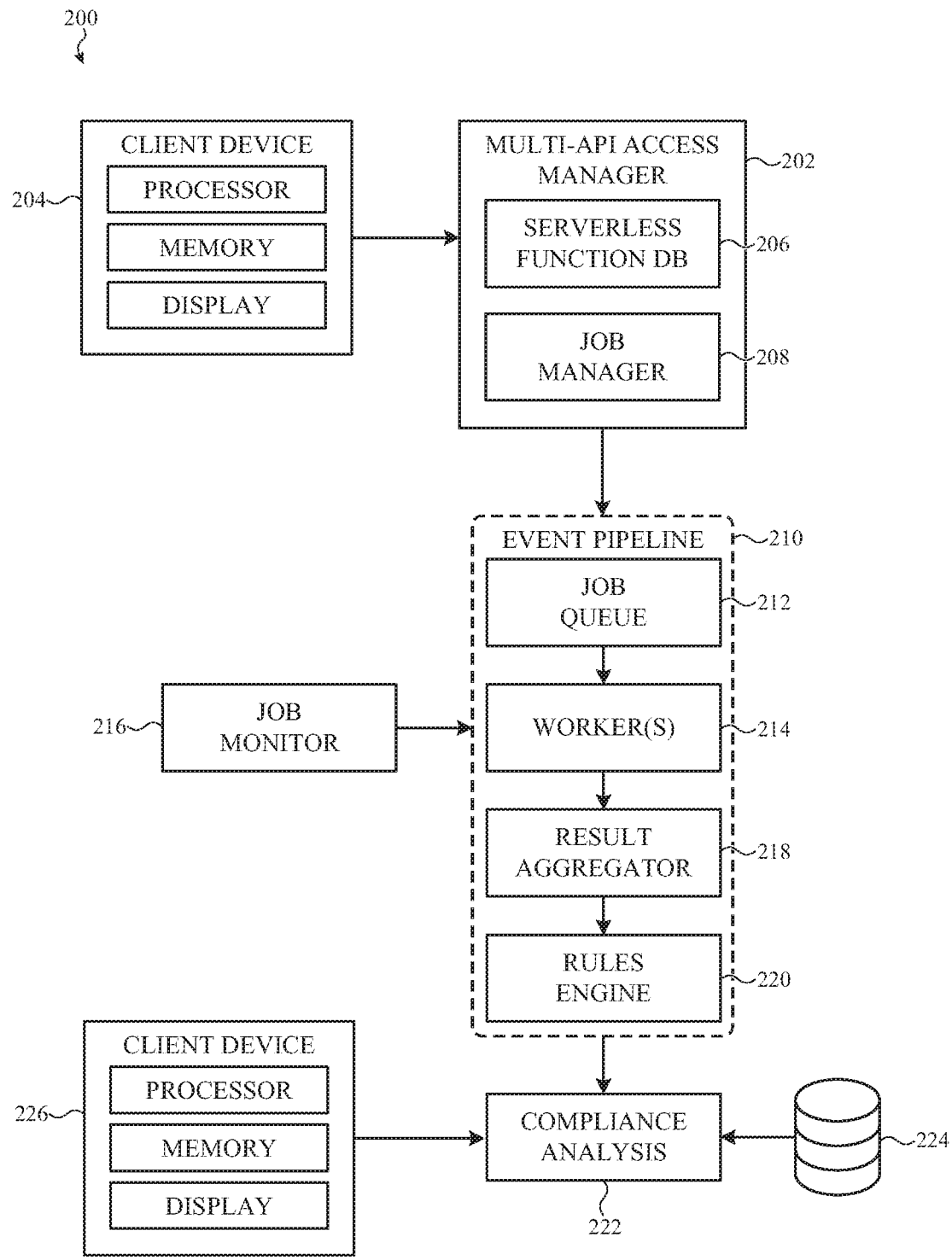
FIG. 2 depicts a system diagram of a system configured to facilitate security policy compliance testing, leveraging one or more operations of an access management service.

FIG. 2 depicts a system diagram of a system configured to facilitate security policy compliance testing and scoring, as described herein.

As with other embodiments described herein, the system 200 includes an API access manager 202 which may be configured to receive command and control instructions from a device operated by an MSP, such as the client device 204. The MSP operating the client device 204 can issue instructions to the API access manager 202 on behalf of an organizational client of the MSP to provision one or more licenses for the organization to one or more third party software platforms.

In many cases, the client device 204 can be an electronic device such as the client device 102 of FIG. 1; the client device 204 can include a processor, a memory, and/or a display that are configured to cooperate to instantiate an instance of software configured to receive command and control instructions from a user (MSP) of the client device 204. More simply, the client device 204 can be configured in a similar manner as the client device 102 of FIG. 1; this description is not repeated.

Upon receiving an instruction from the client device 204, and/or in response to occurrence of a scheduled event, the API access manager 202 can be configured to access one or more serverless functions from a serverless function database 206. Each retrieved serverless function can thereafter be wrapped, with appropriate arguments, into a job by a job manager 208.

Each job created by the job manager 208 can be added as input to an event pipeline 210, which can include a job queue 212. Job items or work items can be added to and removed from the job queue 212 in any suitable order. One or more worker nodes 214 can be configured to pop jobs from the job queue 212 to execute those jobs/work items against respective third party APIs. In this manner individual serverless functions, configured with with suitable arguments, can be executed in series and/or asynchronously.

In many cases, a job monitor 216 may be configured to monitor execution of each job by each worker node to determine whether the worker nodes execute jobs successfully. In an event that the job monitor 216 determines that a particular job has failed, a serverless function associated with the failed job can be flagged for review by a developer or maintainer of that serverless function. For example, the job monitor 216 may be configured to automatically create an issue in an issue tracking system such that a developer of the serverless function is automatically notified of the failed execution.

Once a job successfully executes, results of the execution can be passed to and/or otherwise received by a result aggregator 218. The result aggregator 218 can, in turn, bundle results of execution of one or more serverless functions (as jobs) as a single structured data object and can provide that structured data object as input to a rules engine 220, which may as described above, apply one or more client-specific and/or licensee-specific rules to the input data.

For example, usage data obtained for a particular organization or user by a particular job (scheduled/instructed by an MSP operating the client device 204) from a particular third-party API can be provided as input to the rules engine 220 which may apply one or more client-specific and/or licensee specific rules to calculate a cost associated with that determined usage. In other words, different licenses may be negotiated by an MSP on behalf of an organization client differently; similar usage under different license structures may result in different costs, which may be applied by and/or managed by the rules engine 220.

Output from the rules engine 220 can be provided as input to an invoicing system that can be configured to generate invoices on behalf of the MSP, bundling different costs of a particular organization's use of multiple third-party APIs and creating invoices corresponding to the organization's license structures with respect to each of those third-party software vendors. Thereafter, the MSP may receive, back at the client device 204, an invoice for a particular organization that aggregates, based on usage data obtained by querying (with one or more jobs) each respective third-party API vendor licensed by the organization, costs for that particular organization.

In many embodiments, the event pipeline 210 can also provide input to a compliance analysis system 222. Like the rules engine 220, the compliance analysis system 222 can be configured to receive as input usage data corresponding to API and/or product usage of a particular organization and/or a particular employee of the organization. In some cases, the compliance analysis system 222 can thereafter be configured to compare retrieved usage and/or configuration information to one or more security compliances schemas, rules, or definitions stored in a database 224.

For example, the compliance analysis system 222 can be configured to determine whether installed instances of software used by an organization are all fully updated. In such an example, the compliance analysis system 222 can issue an instruction to the job manager 208 to issue a job or a series of jobs (with appropriately wrapped serverless functions obtained from the serverless function database 206) to query one or more usage data API endpoints of one or more third party APIs. In response, the compliance analysis system 222 can receive results of execution of these jobs which may include one or more structured data objects with attributes that include versions of client applications that have accessed one or more third party tools in a particular time period.

With this information and/or with configuration information and/or other metadata obtained in a similar manner, the compliance analysis system 222 can be configured to perform analysis so as to determine whether such information is in compliance with one or more security policy definitions and/or schemas stored in the database 224.

For example, as noted above, the database 224 can store multiple different schemas that define particular security policies. For example, a security policy may require 2FA or a particular type of 2FA (one-time passcode, time-based one-time passcode, hardware key, and so on). In other cases, a security policy may require a particular encryption to be implemented in backend databases. In another example, a security policy may require a particular minimum software version for particular software. In another example, a security policy may require a particular network configuration (e.g., VPN, separated VLANs, particular firewall rules, and so on). In another example, a security policy may require a particular configuration of a particular software tool—for example, a storage and/or backup application may be required to be backed up on a particular interval.

These foregoing example security policies are not exhaustive; a person of skill in the art will readily appreciate that any number of suitable security policies can be stored in the database 224 in any suitable manner.

Once one or more appropriate security policies are obtained from the database 224, each can be validated and/or otherwise used to evaluate organization data obtained from the event pipeline 210. Some of the security policies may evaluate to a binary number, some security policies may evaluate to a Boolean value, some security policies may evaluate to a graduated scale, some security policies may evaluate to a numeric value; may configurations are possible.

Once each security policy is evaluated, on some examples, the results of evaluating the schemas can be aggregated together. In some cases, multiple numerical results can be averaged. In other cases, multiple numerical results can be sorted and/or upper or lower extreme values may be extracted therefrom. In some cases, a binary or Boolean value can be configured to a numerical value on a particular scale (e.g., 0 to 1.0). Many configurations are possible.

More generally and broadly, it may be appreciated that the results of execution/validation of one or more security policy schemas can be aggregated into a single value or a smaller set of different values. These values can, thereafter, be presented as a single security compliance score (or set of scores), viewable on a client device such as the client device 226. The client device 226 can be operated by, in some cases, a third-party insurance carrier associated with an organization. In other cases, the client device 226 may be associated with a security operations center of the organization itself.

These foregoing embodiments depicted in FIGS. 1-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3A:
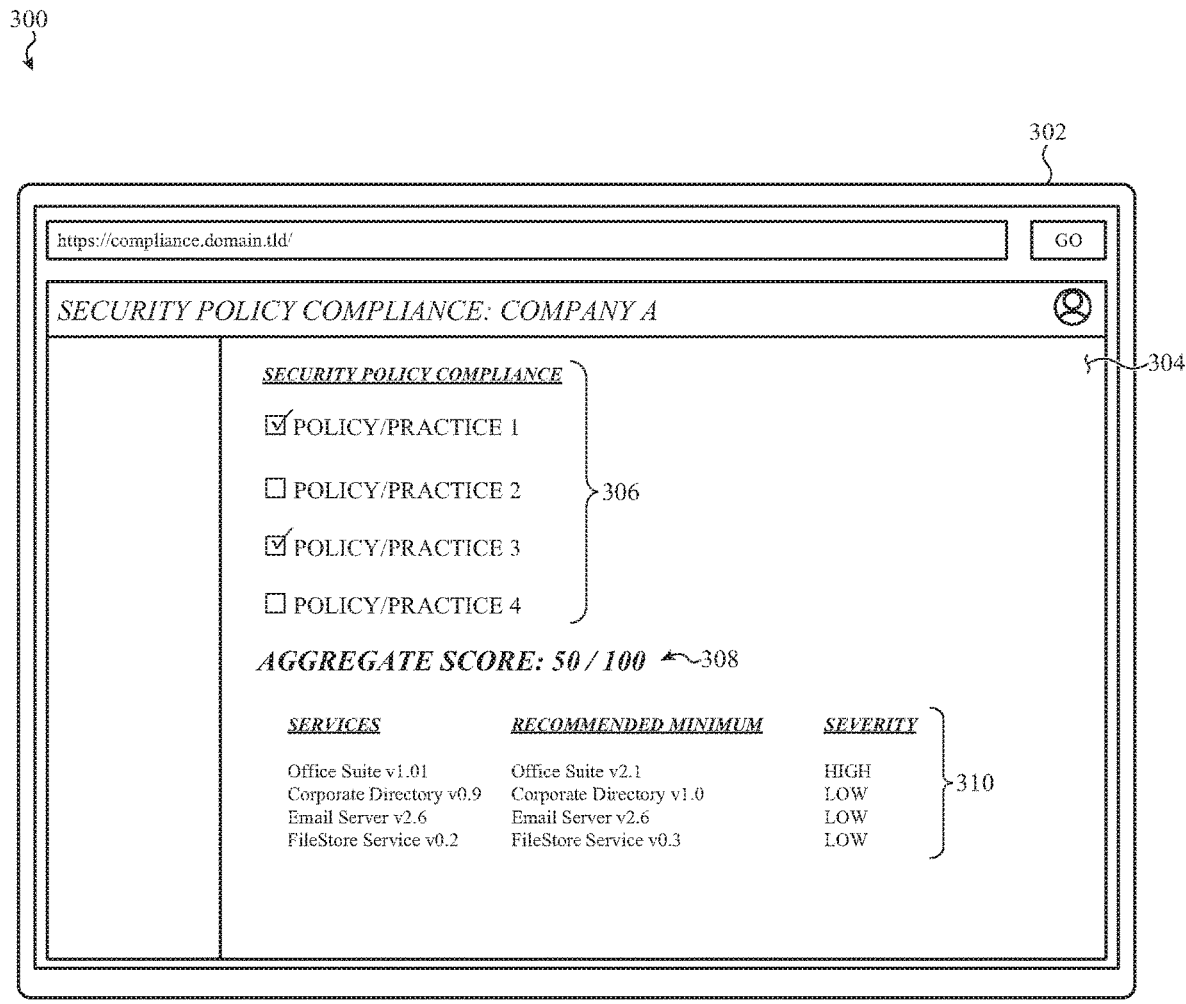
FIGS. 3A-3B depict a client device executing an instance of a client application rendering a graphical user interface of a system configured to facilitate security policy compliance testing, such as described herein.

FIG. 3A depicts a client device executing an instance of a client application rendering a graphical user interface of a system configured to facilitate security policy compliance testing by and/or with an access management service, such as described herein.

The client device 300 includes a display 302 that can be operated by an instance of software instantiated by cooperation of a processor and memory (not shown). The instance of software may be referred to as a frontend application, and may cause to be rendered on the display a graphical user interface 304. The graphical user interface 304 can include a content view area in which content associated with the frontend application can be rendered.

The frontend application is configured to interface with and provide command and control instructions to a compliance analysis subsystem of an access management service, such as described herein.

In particular, the frontend application can be configured to render one or more graphical user interface elements 306, 308, 310 which may be selected by a user.

For example, an insurance carrier or agent thereof can operate the graphical user interface element 306 to select one or more policies and/or security practices to verify compliances of a particular selected organization such as COMPANY A. Once at least one security policy is selected, a second graphical user interface element 308 can be updated to display a numerical representation of an assessment of security compliance.

In some embodiments, another graphical user interface element 310 can be included to depict one or more specific recommendations or indications of noncompliance, such as enumerating all deployed software alongside version numbers in use and version numbers recommended.

The foregoing embodiment depicted in FIG. 3A and the various alternatives thereof and variations thereto are presented, generally, for purposes of explanation, and to facilitate an understanding of various configurations and constructions of a user interface that may be associated with a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3B:
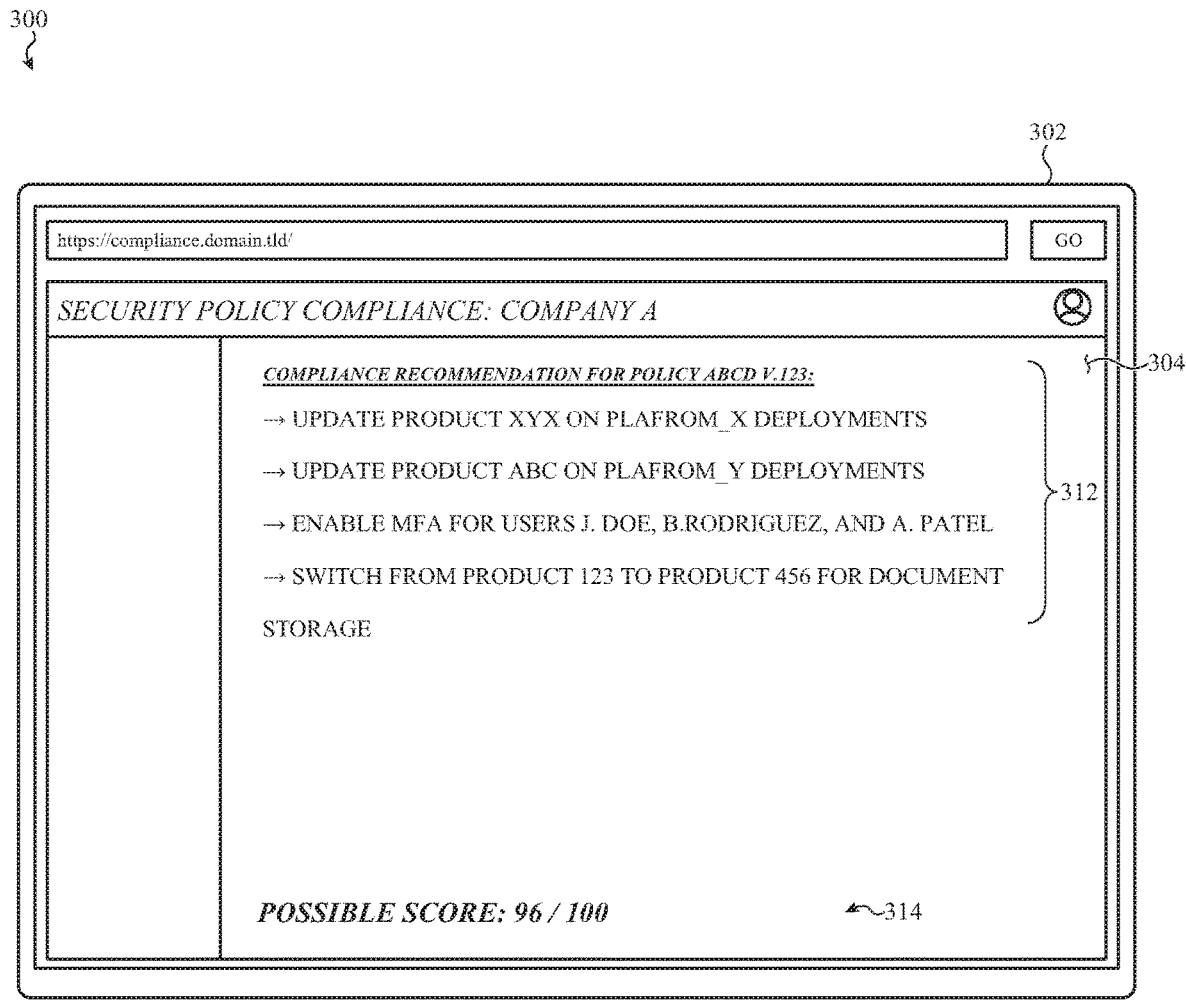

For example, in some embodiments, a graphical user interface of a system as described herein can be configured to render one or more suggestions to an organization and/or to an interested party, such as an insurance organization. For example, as shown in FIG. 3B, the client device 300 includes the display 302, which in turn renders the graphical user interface 304. The graphical user interface 304 in this example can receive input from a backend application instance of a system as described herein to render one or more mitigations and/or suggestions to a user of the client device 300. For example, the backend application instance can be configured to determine a compliance gap for a particular organization in respect of a particular version of a particular compliance policy.

For example, the system may determine that an organization's current software suite and configuration thereof fails to comply with a particular security standard (examples include, but are not limited to SOC2, NIST, HIPAA, and so on). The organization may fail for a variety of reasons. For example, a particular documentation platform may comply with the security standard only for a particular operating system. In other cases, an email service/server may only comply with a particular security policy/standard if that server is accessed only with a particular email client application. In another example, an organization may have misconfigured a particular software product. In another example, an organization's new hire may not be properly onboarded for a period of time (e.g., days, weeks, and so on) potentially exposing the organization to a data breach risk, albeit briefly.

A person of skill in the art may readily appreciate that these examples are not exhaustive; many different reasons may be determined by a system as described herein to cause an organization to fail compliance with a particular policy.

In these embodiments, a backend application instance as described herein can be configured to identify in a suitable manner one or more potential cures for the deficiencies identified. For example, if it is determined that an organization fails to meet a particular security standard, the system can recommend changes that—if implemented properly and comprehensively—could bring the organization into compliance.

For example, the system may suggest to an organization to, without limitation: reconfigure a particular software product; update a configuration of a particular user of a particular software product; update a particular software client on a particular device; switch from one software product to another software product; change building or premises security procedures; change one or more document retention settings within a software product; enable or disable a feature of a particular software product (e.g., disk encryption, multifactor authentication, and so on).

FIG. 3B depicts an example graphical user interface (the graphical user interface 304) that can be associated with a system as described herein, and that may be configured to render for an organization or an interested party suggestions for how to cure a particular deficiency or set of deficiencies. In this example, once a particular policy and version of that policy is selected, one or more suggestions generated by the backend application instance can be displayed in a suggestion list 312. The suggestion list 312 can show any suitable number of suggestions to a user of the client device 300. The text of the suggestions within the suggestion list 312 can vary from embodiment to embodiment; in some examples, a "cure list" with detailed suggestions can be displayed to an organization or agent thereof, whereas a "curable" list can be shown to an insurance carrier. The curable list may indicate whether identified deficiencies can be cured (or are likely to be curable) within a particular time period. For example, if a curable item identified by the backend application instance can be typically cured in less than 24 hours, the item may be shown to an insurance agent as "immediately curable." whereas if the backend application instance determines that to cure a particular deficiency typically requires redeployment of multiple software instances, the insurance agent may be shown in the graphical user interface 304 an indication that the item is "not readily curable." In this manner, privacy of the organization can be maintained while information relevant to policy issuance decisions can be communicated to appropriate actuaries or other parties.

In some cases, the graphical user interface 304 can be configured to display a possible maximum compliance score, such as the possible score 314.

The foregoing embodiment depicted in FIGS. 3A-3B and the various alternatives thereof and variations thereto are presented, generally, for purposes of explanation, and to facilitate an understanding of various configurations and constructions of a user interface that may be associated with a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some cases, a system as described herein can be configured to afford an organization a particular window of time to cure deficiencies before a score is reported to third parties. For example, if a third party requests a score generated in respect of a particular organization, and the system determines that the organization does not satisfy the relevant security policy, the system may inform the organization of either or both the compliance deficiency and/or the third-party compliance score request. In this case, the system may wait for a period of time to report to the third-party to give the organization a chance to cure it's deficiencies. In some cases, a cure period may be on the order of days, weeks, months, quarters, or any other suitable time period. The cure period may be set by a particular MSP, a particular organization, a particular insurance provider (or other third party), a standards-setting body, or any other appropriate person or entity.

In yet other examples, a system as described herein can be configured to record compliance states for an organization over time. In such configurations, if a data breach or other security event occurs, the organization can retroactively audit software configurations states as such configurations existed at that time. Such information can be helpful to the organization and/or one or more security researchers in determining a source of a breach.

In further embodiments, historical information can be used by third parties to determine, retroactively, one or more software configurations or package combinations that are more closely associated with data breaches than other software configurations. As may be appreciated by a person of skill in the art, such information, as collected and served by a system as described herein can be useful to inform premium setting.

Figure 4:
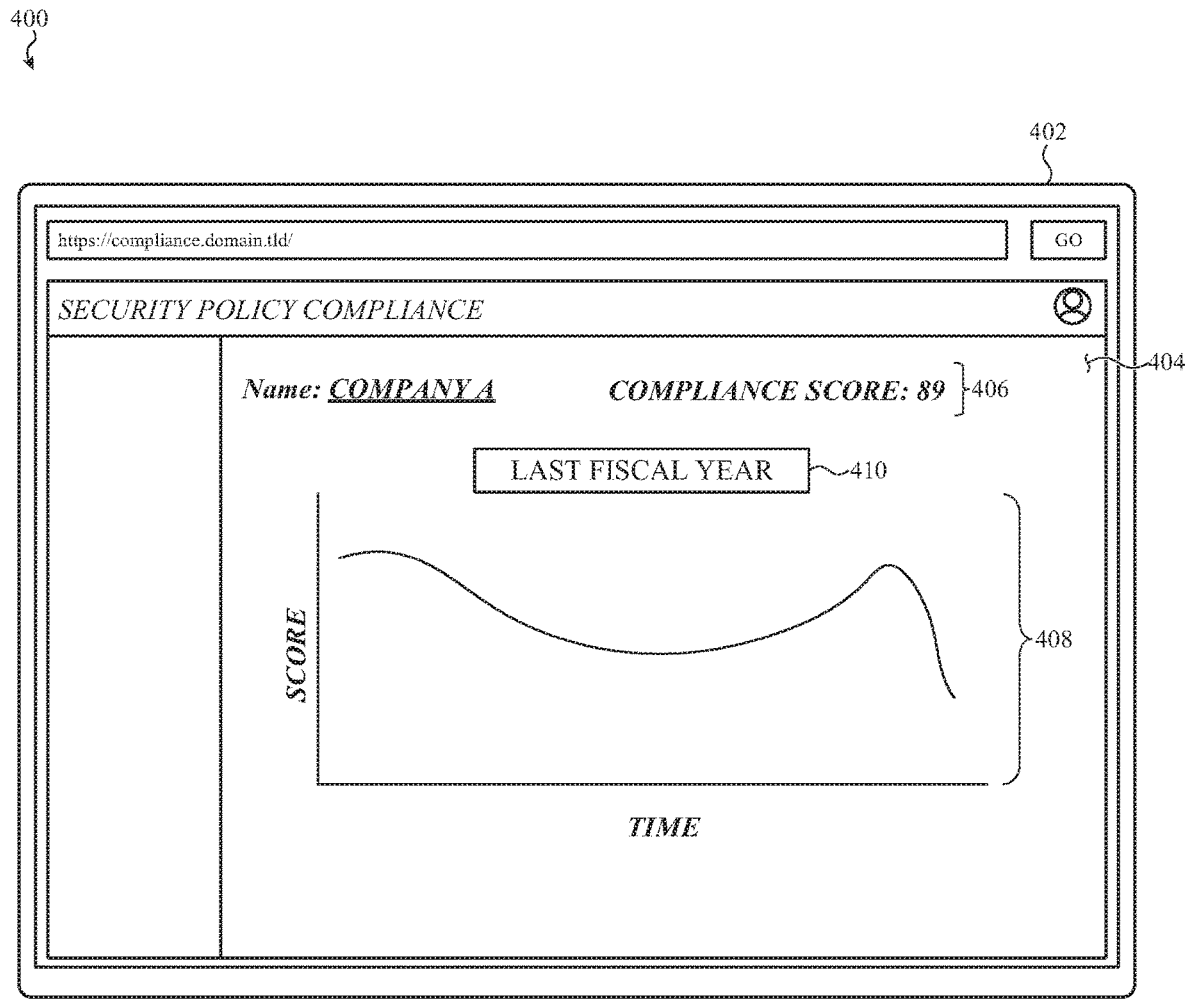
FIG. 4 depicts a client device executing an instance of a client application rendering a graphical user interface of a system configured to facilitate security policy compliance testing, such as described herein.

For example, in other embodiments, different graphical representations of security compliance scores can be used. FIG. 4 depicts a client device 400 including a display 402 rendering a graphical user interface 404 that includes a numerical representation 406 of a particular organization's security policy compliance, as evaluated by a system as described herein. In this example, however, a time series representation 408 of the organization's score over time may be shown. In this example, an insurer operating the client device 400 can select one or more periods of time from a selection element 410, which in turn can cause the time series representation 408 to display a different range of scores.

Insurers or other interested parties may inform policy issuance decisions based, at least in part, on a duration during which a score is maintained.

The foregoing embodiment depicted in FIGS. 3A-4 and the various alternatives thereof and variations thereto are presented, generally, for purposes of explanation, and to facilitate an understanding of various configurations and constructions of a user interface that may be associated with a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
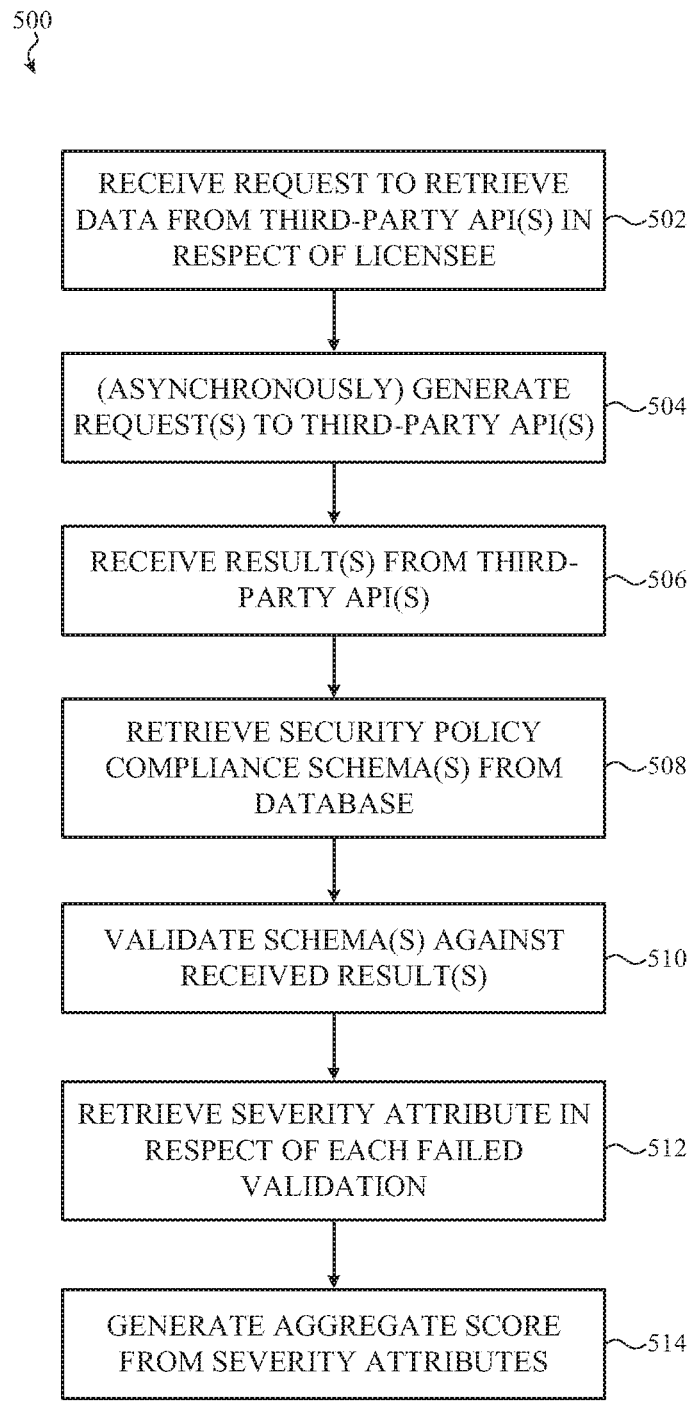
FIG. 5 is a flowchart depicting example operations of a method of providing security policy compliances as a service.

FIG. 5 is a method diagram depicting a flowchart of operations of a method of operating a system as described herein. As with many embodiments, the system may be instantiated by cooperation of a processor, memory, or other suitable infrastructure or combination of interoperating hardware.

The method 500 includes operation 502 at which a request is received to obtain a compliance score in respect of a particular organization or licensee of a particular software product. At operation 504, one or more requests to obtain usage and/or configuration data can be created by a system as described herein (e.g., serverless functions encapsulated in jobs to be executed by a worker). At operation 506, results from execution of the requests can be received, which may include usage data of a particular third-party software platform by an organization in aggregate or each individual employee thereof.

Next, at operation 508, a database can be queried to obtain one or more security policy compliance schemas. At operation 510, the selected schemas can be validated against, at least in part, the obtained data at operation 506—which can include software configuration information and/or deployment information and/or usage information.

Next, at operation 512, optionally, one or more failed validations can be selected, sorted and/or categorized based on the severity thereof. For example, a failed validation of minor severity may be ignored and/or discounted, whereas a failed validation of a major severity may be selected specifically at operation 512.

Next at operation 514, an aggregate security compliance score can be generated based at least in part on each passed validation and/or based at least in part on the selected severe failed validations identified at operation 512.

Figure 6:
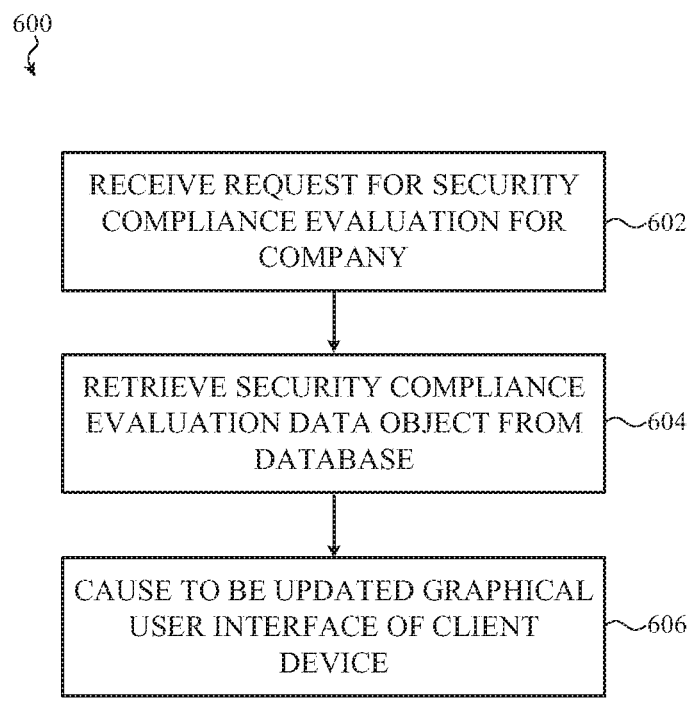
FIG. 6 is a flowchart depicting example operations of a method of operating a security policy compliance testing system as described herein.

FIG. 6 is another method diagram depicting a flowchart of operations of a method of operating a system as described herein. As with many embodiments, the system may be instantiated by cooperation of a processor, memory, or other suitable infrastructure or combination of interoperating hardware.

The method 600 includes operation 602 at which a request to retrieve a compliance score for a particular organization or company is received. At operation 604, a data object corresponding to the compliance score can be retrieved from a database after which, at operation 606, the retrieved data object can be parsed and/or loaded into memory and used to update a graphical user interface, such as a graphical user interface operated by a breach insurance actuary or underwriter.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, the term "memory" refers to any software and/or hardware-implemented data storage device or circuit physically and/or structurally configured store digital information. This term is meant to encompass a single memory cell or unit, multiple memory blocks and systems, analog or digital circuits, or other suitably configured data or information storage element or combination of elements.

Example processing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Further, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on.

The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel.

In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:
1. A server system comprising:
a memory resource; and
a processing resource operably intercoupled with the memory resource and configured to instantiate an instance of software configured to:
receive, as input, first information identifying an organization;
receive, as input, second information identifying an information security standard;
query a first data store, with the first information, to retrieve a set of third-party software licensed by and deployed by the organization;
generate a set of structured data representations by:

for each third-party software of the set of third-party software, query a second data store to retrieve a respective structured data representation of a respective configuration of the respective third-party software as deployed by the organization as of receiving the first information;

query a third data store, with the second information, to retrieve a data object comprising attributes corresponding to software configuration requirements imposed by the information security standard;

for each respective attribute of the data object, determine whether the respective software configuration requirement imposed by the information security standard is satisfied by at least one structured data representation of the set of structured data representations and:

in response to determining that the respective software configuration requirement is not satisfied by any structured data representation of the set of structured data representations, provide a first output asserting that the organization fails to comply with the information security standard; and in response to determining that the respective software configuration requirement is satisfied by at least one structured data representation of the set of structured data representations, provide a second output asserting that the organization at least partially complies with the information security standard; and in response to determining that each software configuration of each respective attribute of the data object is satisfied by at least one structured data representation of the set of structured data representations, provide a third output asserting that the organization fully complies with the information security standard.

2. The server system of claim 1, wherein:

the instance of software is a backend application instance configured to communicably couple to a frontend application instance instantiated by a client device communicably coupled to the server system;

the first information is received from the frontend application instance;

the second information is received form the frontend application instance; and the first, second, and third outputs are provided to the frontend application instance to cause the frontend application instance to display, in a graphical user interface thereof, a visual indication corresponding to the first, second, or third outputs respectively.

3. The server system of claim 2, wherein the visual indication comprises a numerical score.

4. The server system of claim 3, wherein the numerical score corresponds to a number of attributes of the data object satisfied by at least one structured data representation of the set of structured data representations.

5. The server system of claim 1, comprising:
a database comprising:
the first data store; and
the second data store.

6. The server system of claim 1, wherein at least one structured data representation of the set of structured data representations comprises a version of the respective third-party software.

7. The server system of claim 1, wherein the instance of software is configured to:
receive a request comprising:
the first information; and
the second information; and
provide a response to the request comprising one of:

the first output;
the second output; and
the third output.

8. The server system of claim 7, wherein the response comprises a numerical score corresponding to one of the first output, the second output, and the third output.

9. The server system of claim 8, wherein the numerical score is normalized to a graduated scale.

10. The server system of claim 7, wherein the response comprises a nonnumerical score corresponding to one of the first output, the second output, and the third output.

11. A method of auditing compliance of an organization with one or more security policies, the method comprising:

receiving from a frontend instance of software instantized at a client device, at a backend instance of software instantiated by cooperation of processing resources and memory resources, a request comprising:

first information identifying an organization; and second information identifying at least one information security standard;

in response to the request, querying a first database to determine whether a compliance score exists in respect of the organization and the information security standard;

in accordance with a first determination that the compliance score exists, generating a response to the request, the response comprising the compliances score; or in accordance with a second determination that the compliance score does not exist:

querying a first data store, with the first information, to retrieve a set of third-party software licensed by and deployed by the organization;

generating a set of structured data representations by querying a second data store with each respective third-party software to, for each respective third-party software, retrieve a respective structured data representation of a respective configuration of the respective third-party software as deployed by the organization as of receiving the request;

querying a third data store, with the second information, to retrieve a data object comprising attributes corresponding to software configuration requirements imposed by the information security standard;

for each respective attribute of the data object, determine whether the respective software configuration requirement imposed by the information security standard is satisfied by at least one structured data representation of the set of structured data representations and:

in response to determining that the respective software configuration requirement is not satisfied by any structured data representation of the set of structured data representations, providing a first output asserting that the organization fails to comply with the information security standard; and in response to determining that the respective software configuration requirement is satisfied by at least one structured data representation of the set of structured data representations, providing a second output asserting that the organization at least partially complies with the information security standard;

in response to determining that each software configuration of each respective attribute of the data object is satisfied by at least one structured data representation of the set of structured data representations, providing a third output asserting that the organization fully complies with the information security standard;

generating the compliance score from at least one of the first output, the second output, or the third output; and generating the response to the request, the response comprising the compliance score; and transmitting the response to the frontend instance to cause a graphical user interface of the frontend instance to display the compliance score.

12. The method of claim 11, wherein the compliance score is normalized to a graduated scale.

13. The method of claim 11, wherein the compliance score is a numeric value within a range of numeric values.

14. The method of claim 11, wherein:

the second information identifies at least two information security standards; and the response comprises at least two compliances scores, each in respect of a respective one information security standards of the at least two information security standards.

15. A method of auditing compliance of an organization with one or more security policies, the method comprising:

receiving from a frontend instance of software instantized at a client device, at a backend instance of software instantiated by cooperation of processing resources and memory resources, a request comprising:

first information identifying an organization;

second information identifying a selected information security standard;

third information comprising a date range; and receiving fourth information comprising a formula for determining compliance scores;

querying a database with the first information, the second information, and the third information to retrieve a set of historical compliance scores generated in respect of the organization and the selected information security standard at different times within the date range, each historical compliance score of the set of historical compliances score calculated according to the formula by the backend instance of software by determining which third-party software licensed by the organization through the backend instance and deployed by the organization complied with the selected information security standard;

generating a response to the request, the response comprising the set of historical compliances scores; and communicating the response to the frontend instance.

16. The method of claim 15, wherein the second information is selected from a set of information security standards.

17. The method of claim 15, wherein each of the compliances scores of set of historical compliances scores comprise a numerical value.

18. The method of claim 15, wherein the second information identifies a version of the information security standard.

19. The method of claim 15, wherein communicating the response to the frontend instance causes a graphical user interface of the frontend instance to display a graph corresponding to the set of historical compliances scores over time.

* * * * *